US009021525B2

(12) United States Patent
Chang

(10) Patent No.: US 9,021,525 B2
(45) Date of Patent: Apr. 28, 2015

(54) BROADCASTING RECEIVING APPARATUS AND CONTROL METHOD THEREOF

(75) Inventor: Hye-young Chang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 93 days.

(21) Appl. No.: 13/478,417

(22) Filed: May 23, 2012

(65) Prior Publication Data

US 2012/0233643 A1 Sep. 13, 2012

Related U.S. Application Data

(63) Continuation of application No. 11/942,272, filed on Nov. 19, 2007, now Pat. No. 8,205,229.

(30) Foreign Application Priority Data

Jul. 6, 2007 (KR) ........................ 10-2007-0067965

(51) Int. Cl.
*H04N 5/445* (2011.01)
*H04H 60/37* (2008.01)
*H04H 20/24* (2008.01)
*H04H 60/27* (2008.01)

(52) U.S. Cl.
CPC ............... *H04H 60/37* (2013.01); *H04H 20/24* (2013.01); *H04H 60/27* (2013.01)

(58) Field of Classification Search
CPC H04N 21/482; H04N 5/4401; H04N 5/44543
USPC ............................... 725/37–61; 709/217–232
See application file for complete search history.

(56) References Cited

U.S. PATENT DOCUMENTS

| | | | | |
|---|---|---|---|---|
| 5,481,296 | A * | 1/1996 | Cragun et al. | 725/136 |
| 5,929,849 | A * | 7/1999 | Kikinis | 725/113 |
| 6,141,003 | A | 10/2000 | Chor et al. | |
| 6,177,931 | B1 | 1/2001 | Alexander et al. | |
| 6,219,837 | B1 | 4/2001 | Yeo et al. | |
| 6,263,501 | B1 * | 7/2001 | Schein et al. | 725/39 |
| 6,282,713 | B1 * | 8/2001 | Kitsukawa et al. | 725/36 |
| 6,338,094 | B1 | 1/2002 | Scott et al. | |
| 6,519,771 | B1 | 2/2003 | Zenith | |

(Continued)

FOREIGN PATENT DOCUMENTS

| | | | |
|---|---|---|---|
| GB | 2323489 | A | 9/1998 |
| JP | 2003-51753 | A | 2/2003 |
| KR | 10-2004-0003601 | A | 1/2004 |

OTHER PUBLICATIONS

Communication dated Oct. 11, 2013 issued by the European Patent Office in counterpart European Patent Application No. 08152221.1.

(Continued)

*Primary Examiner* — Annan Shang
(74) *Attorney, Agent, or Firm* — Sughrue Mion, PLLC

(57) ABSTRACT

There is provided a broadcasting receiving apparatus. The broadcasting receiving apparatus includes: a receiver which receives a broadcasting signal of a broadcasting channel; a UI generator which generates a data broadcasting UI; and a controller which controls the UI generator to generate a channel data broadcasting UI including a data broadcasting item corresponding to broadcasting contents of a tuned broadcasting channel if data broadcasting is received through the receiver.

16 Claims, 6 Drawing Sheets

(56) References Cited

U.S. PATENT DOCUMENTS

| | | | | |
|---|---|---|---|---|
| 6,704,773 | B1 | 3/2004 | Cohn et al. | |
| 6,763,522 | B1 * | 7/2004 | Kondo et al. | 725/39 |
| 6,829,781 | B1 | 12/2004 | Bhagavath et al. | |
| 7,313,805 | B1 | 12/2007 | Rosin et al. | |
| 7,603,683 | B2 | 10/2009 | Reto | |
| 7,774,816 | B2 * | 8/2010 | Bumgardner et al. | 725/83 |
| 8,387,083 | B1 * | 2/2013 | Prasad | 725/14 |
| 8,402,503 | B2 * | 3/2013 | Malik | 725/135 |
| 8,516,525 | B1 * | 8/2013 | Jerding et al. | 725/53 |
| 2007/0101370 | A1 * | 5/2007 | Calderwood | 725/47 |
| 2008/0072260 | A1 | 3/2008 | Rosin et al. | |
| 2011/0209173 | A1 * | 8/2011 | Vaysman et al. | 725/25 |

OTHER PUBLICATIONS

Communication dated Jul. 31, 2013 from the Korean Intellectual Property Office in a counterpart application No. 10-2007-0067965.

Extended European Search Report from the European Patent Office dated Jul. 25, 2011 in the corresponding European Patent Application No. 08152221.1.

Search Report issued Apr. 3, 2012 by the European Patent Office in counterpart European Application No. 08152221.1.

* cited by examiner

BROADCASTING RECEIVING APPARATUS AND CONTROL METHOD THEREOF

CROSS-REFERENCE TO RELATED APPLICATIONS

This application is a continuation of U.S. application Ser. No. 11/942,272 filed on Nov. 19, 2007, which claims priority from Korean Patent Application No. 10-2007-0067965, filed on Jul. 6, 2007 in the Korean Intellectual Property Office, the disclosures of which are incorporated herein by reference in their entirety.

BACKGROUND OF INVENTION

1. Field of Invention

Apparatuses and methods consistent with the present invention relate to a broadcasting receiving apparatus and a control method thereof, and more particularly, to a broadcasting receiving apparatus which receives data broadcasting and displays a data broadcasting user interface (UI), and a control method thereof.

2. Description of Related Art

A broadcasting receiving apparatus such as a TV, a set-top box, etc. may receive and process a broadcasting signal, and process data broadcasting. In the case of data broadcasting, information (hereinafter, to be called "data broadcasting information") is transmitted in codes or data formats instead of sound and picture formats. The data broadcasting information is included in a broadcasting signal to be transmitted. The broadcasting receiving apparatus detects the data broadcasting information from the received broadcasting signal, and supplies a data broadcasting UI. Data broadcasting standards include multimedia home platform (MHP), multimedia and hypermedia information coding experts group (MHEG), DTV application software environment (DASE), etc.

FIG. 1 illustrates an example of the data broadcasting UI which is supplied by the broadcasting receiving apparatus. If the data broadcasting is received, the broadcasting receiving apparatus informs a user of the supplied data broadcasting. If a user inputs a command to view the data broadcasting, the broadcasting receiving apparatus displays a default data broadcasting UI 20 on a screen 10 as shown in FIG. 1.

The default data broadcasting UI 20 includes a predetermined main page. The main page displays a data broadcasting item 30 that is classified into categories from the data broadcasting information. The data broadcasting item 30 includes pages which have the data broadcasting information. The pages are navigated by a user's input, and display the data broadcasting information included in the data broadcasting item 30. For example, the main page displays the data broadcasting item 30 such as news, sports, weather, stocks, etc. If a user selects the data broadcasting item 30, the concerned page displays information.

However, such a conventional broadcasting receiving apparatus displays the default data broadcasting UI 20 as an initial screen. That is, the data broadcasting UI displays the default data broadcasting UI 20 as the initial screen even though a user desires to view information on the currently-viewed broadcasting. Since the default data broadcasting UI 20 displays the preset data broadcasting item 30 in the same format, a user should search for information from the main page of the default data broadcasting UI 20 first to view the information on the broadcasting channel.

SUMMARY OF THE INVENTION

Accordingly, it is an aspect of the present invention to provide a broadcasting receiving apparatus which displays a data broadcasting UI including information on a currently-viewed broadcasting channel, and a control method thereof.

It is another aspect of the present invention to provide a broadcasting receiving apparatus which uses service information including broadcasting contents of a broadcasting signal to display a data broadcasting UI, and a control method thereof.

It is still another aspect of the present invention to provide a broadcasting receiving apparatus in which a user selects a default data broadcasting UI or a data broadcasting UI corresponding to a broadcasting channel, and a control method thereof.

Additional aspects and/or advantages of the present invention will be set forth in part in the description which follows and, in part, will be obvious from the description, or may be learned by practice of the present invention.

The foregoing and/or other aspects of the present invention can be achieved by providing a broadcasting receiving apparatus, including: a receiver which receives a broadcasting signal of a broadcasting channel; a UI generator which generates a data broadcasting UI; and a controller which controls the UI generator to generate a channel data broadcasting UI including a data broadcasting item corresponding to broadcasting contents of a tuned broadcasting channel if data broadcasting is received through the receiver.

The broadcasting contents may be included in service information of the tuned broadcasting channel.

The broadcasting receiving apparatus may further include a storage unit, wherein the controller may build a database including the data broadcasting item of the data broadcasting and stores the database in the storage unit.

The controller may select a data broadcasting item equal to a keyword of the service information of the tuned broadcasting channel from the database, and control the UI generator to generate the channel data broadcasting UI comprising the selected data broadcasting item.

The channel data broadcasting UI may further include an item on the service information of the tuned broadcasting channel.

The broadcasting receiving apparatus may further include a user input unit, wherein the controller may control the UI generator to display or conceal the data broadcasting UI according to an input of the user input unit.

The UI generator may further generate a first icon to display the channel data broadcasting UI, and the controller may control the UI generator to display the channel data broadcasting UI if the first icon is selected.

The UI generator may further generate a second icon to display a preset default data broadcasting UI, and the controller may control the UI generator to display the default data broadcasting UI if the second icon is selected.

The broadcasting receiving apparatus may further include a display unit which displays the data broadcasting UI thereon.

The foregoing and/or other aspects of the present invention can be also achieved by providing a method of controlling a broadcasting receiving apparatus, the method including: receiving a broadcasting signal of a broadcasting channel; and generating a channel data broadcasting UI which comprises a data broadcasting item corresponding to broadcasting contents of a tuned broadcasting channel if data broadcasting is received.

The broadcasting contents may be included in service information of the tuned broadcasting channel.

The method may further include building and storing a database including the data broadcasting item of the data broadcasting.

The generating the data broadcasting UI may include selecting a data broadcasting item equal to a keyword of the service information of the tuned broadcasting channel from the database and generating the channel data broadcasting UI including the selected data broadcasting item.

The channel data broadcasting UI may further include an item on the service information of the tuned broadcasting channel.

The method may further include displaying or concealing the data broadcasting UI according to a user's input.

The method may further include displaying a first icon to select the channel data broadcasting UI.

The method may further include displaying a second icon to select a preset default data broadcasting UI.

BRIEF DESCRIPTION OF THE DRAWINGS

The above and/or other aspects and advantages of the present invention will become apparent and more readily appreciated from the following description of exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 2:
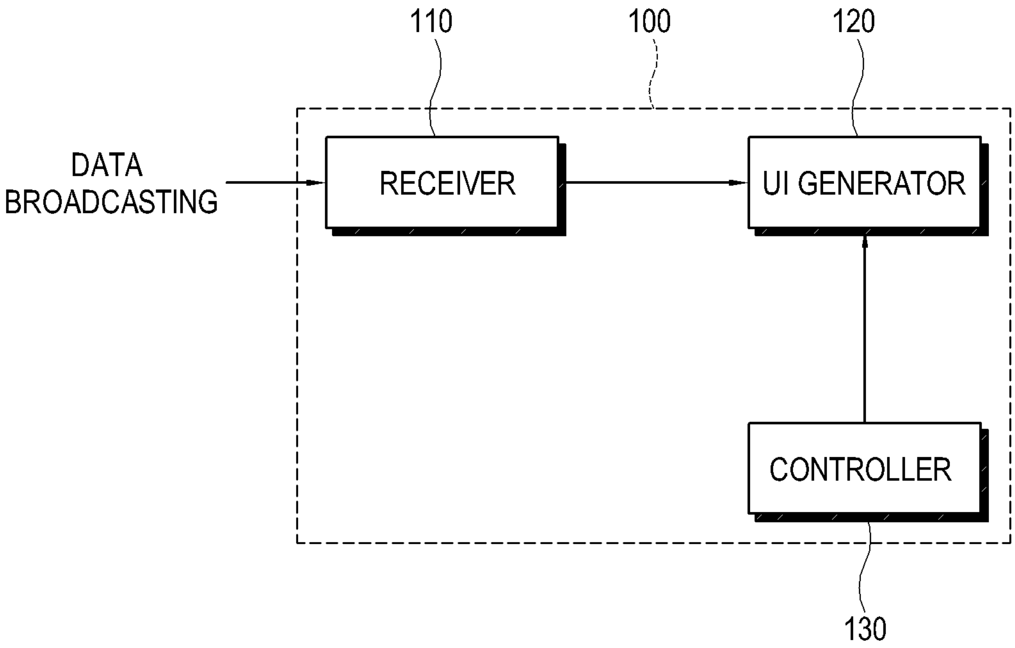
FIG. 2 is a block diagram illustrating a broadcasting receiving apparatus according to an exemplary embodiment of the present invention.
Figure 3:
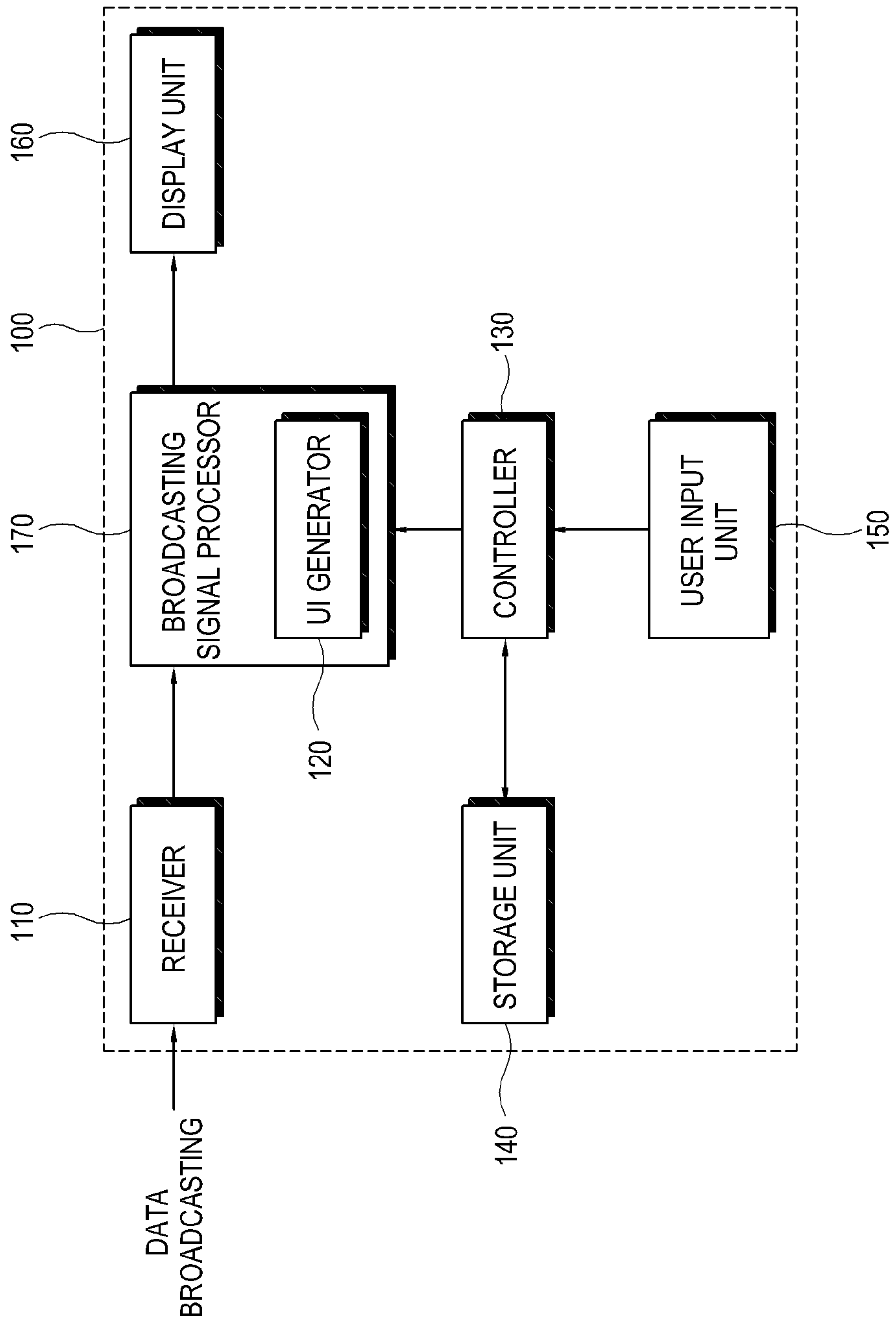
FIG. 3 is a block diagram illustrating a broadcasting receiving apparatus according to another exemplary embodiment of the present invention.

FIG. 2 is a block diagram illustrating a broadcasting receiving apparatus according to an exemplary embodiment of the present invention; and FIG. 3 is a block diagram illustrating a broadcasting receiving apparatus according to another exemplary embodiment of the present invention. The broadcasting receiving apparatus according to an exemplary embodiment of the present invention may receive data broadcasting and display a data broadcasting UI. For example, the broadcasting receiving apparatus may include a TV, a set-top box, etc.

As shown in FIG. 2, the broadcasting receiving apparatus according to an exemplary embodiment of the present invention includes a receiver 110, a UI generator 120, and a controller 130. As shown in FIG. 3, the broadcasting receiving apparatus may further include a storage unit 140, a user input unit 150, a display unit 160, and a broadcasting signal processor 170.

The receiver 110 receives a broadcasting signal of a broadcasting channel. The receiver 110 may receive the broadcasting signal supplied by a broadcasting station through an antenna or a cable. The receiver 110 may include a tuner to tune one of a plurality of broadcasting channels.

The receiver 110 may receive data broadcasting. The broadcasting signal may include data broadcasting information and service information. The data broadcasting information is supplied as a part of a data broadcasting service. The service information refers to information on broadcasting contents of the broadcasting channel. The service information may be included in program specific information (PSI). The broadcasting receiving apparatus may display an electronic program guide (EPG) with the service information. The EPG includes a story line and a broadcasting schedule of the broadcasting program.

Figure 1:
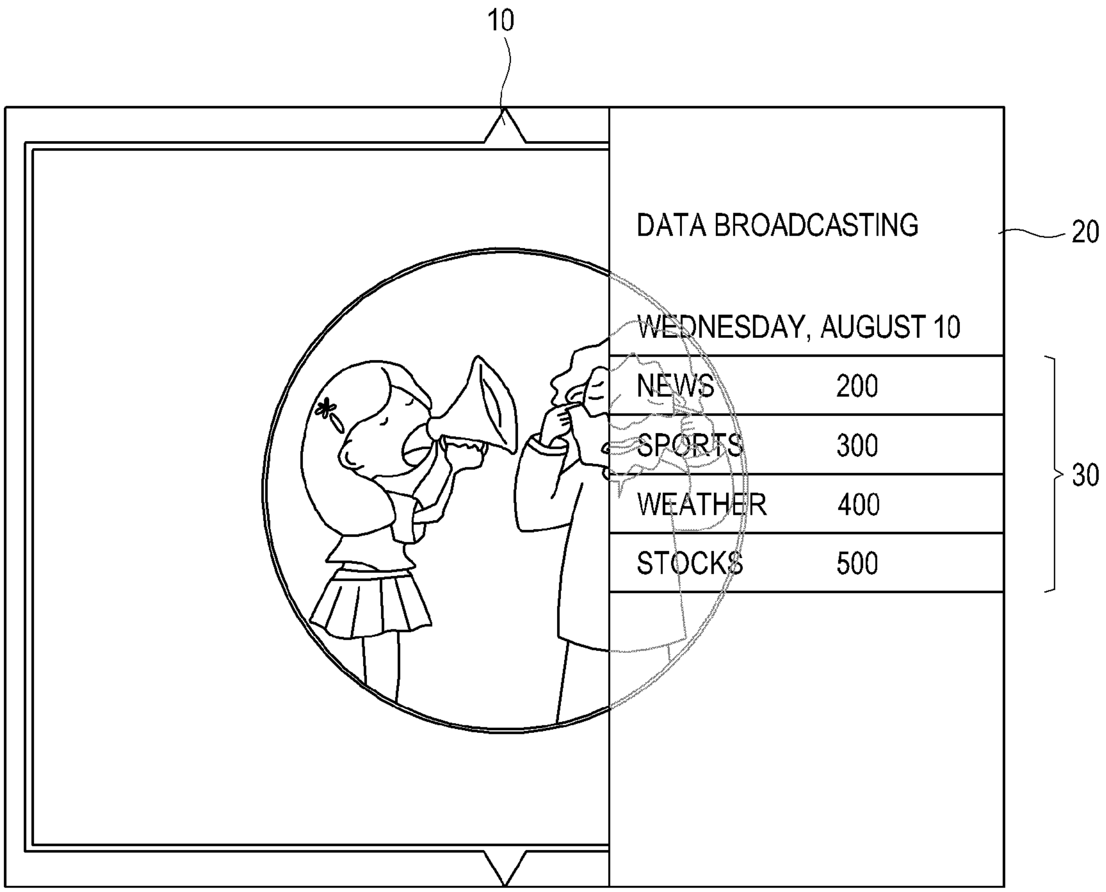
FIG. 1 illustrates a default data broadcasting UI which is displayed on a screen.

The UI generator 120 generates the data broadcasting UI. As shown in FIG. 1, the UI generator 120 may generate a default data broadcasting UI 20. The UI generator 120 may also generate the data broadcasting UI based on the data broadcasting information. The data broadcasting UI includes a data broadcasting item which is classified into categories from the data broadcasting information. That is, the data broadcasting UI includes the data broadcasting item, and the data broadcasting item includes the data broadcasting information. The UI generator 120 may be included in the broadcasting signal processor 170 (see FIG. 3) which processes a received broadcasting signal.

Figure 4:
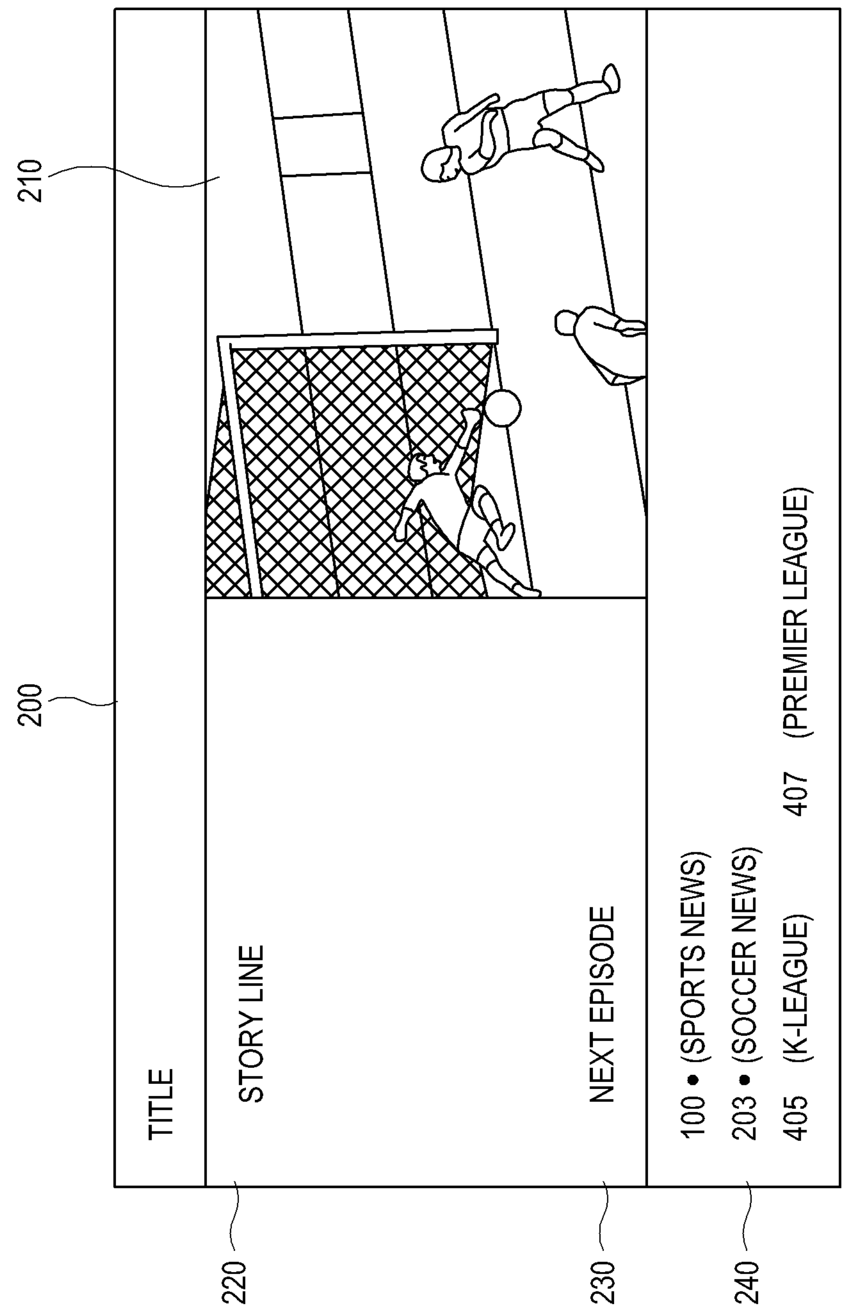
FIG. 4 illustrates a channel data broadcasting UI which is displayed on the screen of the broadcasting receiving apparatus according to an exemplary embodiment of the present invention.

If the data broadcasting is received through the receiver 110, the controller 130 controls the UI generator 120 to generate a channel data broadcasting UI 200 including the data broadcasting item corresponding to the broadcasting contents of the tuned broadcasting channel. The channel data broadcasting UI 200 includes the data broadcasting item providing the data broadcasting information on the broadcasting contents of the broadcasting channel that is currently viewed by a user. As shown in FIG. 4, if a user views a soccer game, the channel data broadcasting UI 200 includes a data broadcasting item 240 related to soccer such as sports news, soccer news, K-League, Premier League, etc.

The broadcasting contents may include a program title, a story line, a preview of a next episode, and a broadcasting time of the tuned broadcasting channel. Information on the broadcasting contents may be included in the service information. The service information includes information on a broadcasting channel which is included in a digital video broadcasting (DVB) stream to be transmitted. That is, the broadcasting signal may include the data broadcasting information and information on the broadcasting contents as well as video and audio data of the broadcasting signal, and the information on the broadcasting contents may be included in the service information.

The broadcasting receiving apparatus may further include the storage unit 140, as shown in FIG. 3. The controller 130 may store a database of the data broadcasting including the data broadcasting item in the storage unit 140. Then, the controller 130 selects the data broadcasting item equal to a keyword of the service information of the tuned broadcasting channel from the database of the data broadcasting, and may control the UI generator 120 to generate the channel data broadcasting UI 200 including the selected data broadcasting item.

For example, the broadcasting receiving apparatus builds the database of the data broadcasting including the data broadcasting item and stores the received data broadcasting information in respective tables of the database of the data broadcasting. Then, the broadcasting receiving apparatus detects the service information of the currently-viewed broadcasting channel to detect at least one keyword therefrom. The broadcasting receiving apparatus searches the data broadcasting information equal to the detected keyword, and displays the channel data broadcasting UI 200 including the data broadcasting item of the searched data broadcasting information.

The channel data broadcasting UI 200 may further include an item on the service information of the tuned broadcasting channel. The item on the service information may include a story line and a preview on a next episode of the broadcasting program. As shown in FIG. 4, the channel data broadcasting UI 200 may include a tuned broadcasting channel 210, a broadcasting program story line 220, a next episode preview 230 and a data broadcasting item 240 on the tuned broadcasting channel 210.

The broadcasting receiving apparatus may further include the user input unit 150 to receive an input from a user. The controller 130 may control the UI generator 120 to display the data broadcasting UI or to conceal the displayed data broadcasting UI according to a user's input. For example, the user input unit 150 may include a remote controller or a hot key in a TV. The user input unit 150 transmits a user's input to the controller 130 to display the data broadcasting UI or to conceal the displayed data broadcasting UI.

The UI generator 120 may further generate a first icon 310 to display the channel data broadcasting UI 200. If the first icon 310 is selected, the controller 130 may control the UI generator 120 to display the channel data broadcasting UI 200. The UI generator 120 may further generate a second icon 320 to display the preset default data broadcasting UI 20. If the second icon 320 is selected, the controller 130 may control the UI generator 120 to display the default data broadcasting UI 20.

Figure 5:
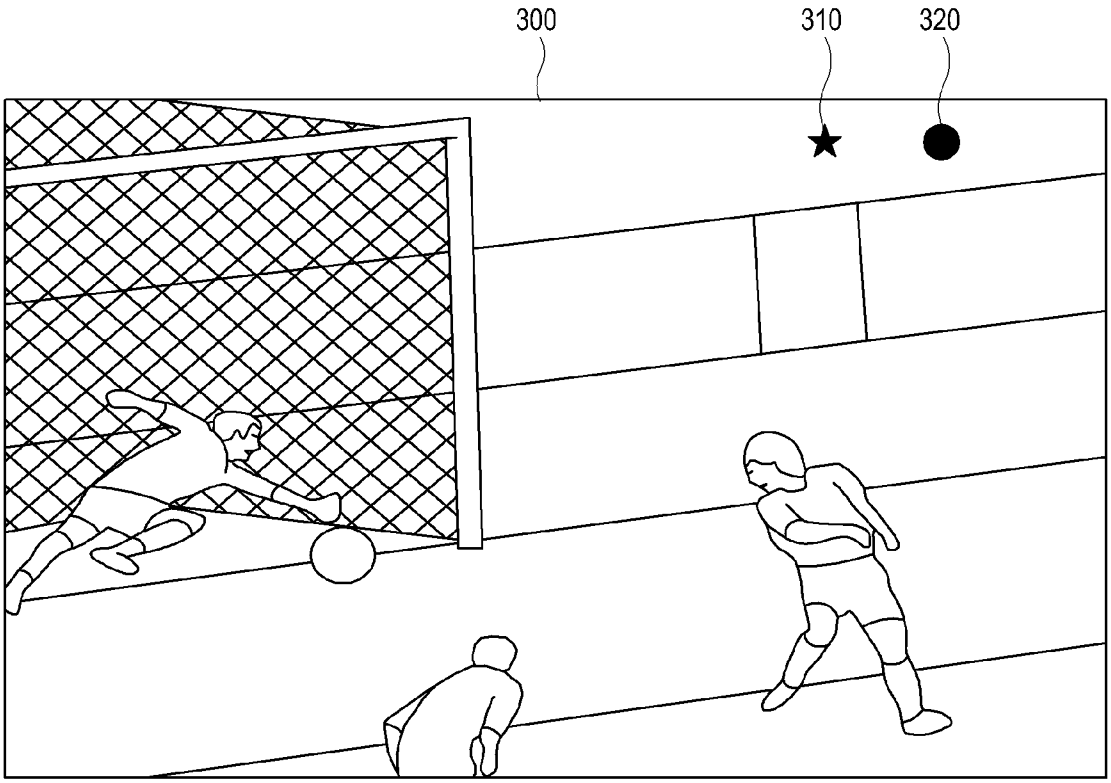
FIG. 5 illustrates a first icon and a second icon which are displayed on the screen of the broadcasting receiving apparatus according to an exemplary embodiment of the present invention.

As shown in FIG. 5, the broadcasting receiving apparatus displays the first icon 310 to display the channel data broadcasting UI 200 and the second icon 320 to display the default data broadcasting UI 20, in the upper right part of the screen 300 displaying the tuned broadcasting channel. If a user selects the first icon 310 through the user input unit 150, the broadcasting receiving apparatus displays the channel data broadcasting UI 200 as shown in FIG. 4. If a user selects the second icon 320 through the user input unit 150, the broadcasting receiving apparatus displays the default data broadcasting UI 20 as shown in FIG. 1.

The broadcasting receiving apparatus may further include the display unit 160 to display the data broadcasting UI thereon, as shown in FIG. 3. The display unit 160 displays the data broadcasting UI generated by the UI generator 120, and an image processed by the broadcasting signal processor 170. The display unit 160 may include a cathode ray tube (CRT), a liquid crystal display (LCD), a plasma display panel (PDP), etc.

Figure 6:
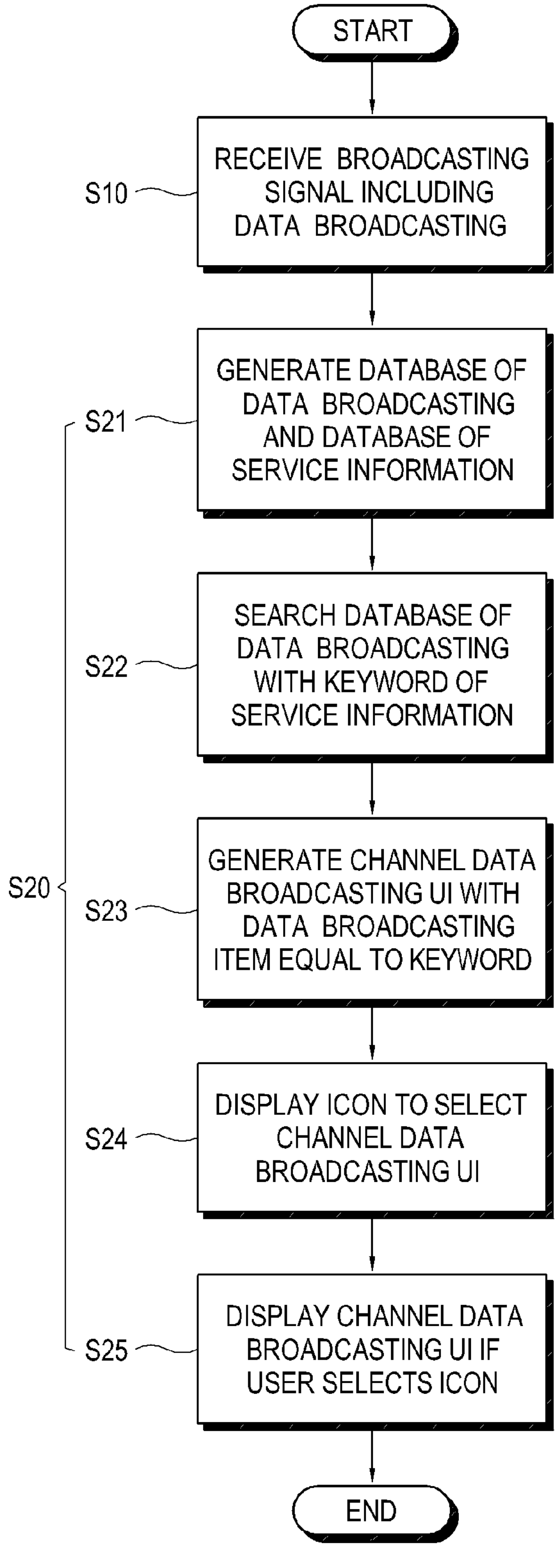
FIG. 6 is a flowchart illustrating an operation of the broadcasting receiving apparatus according to an exemplary embodiment of the present invention.

Hereinafter, a control method of the broadcasting receiving apparatus according to an exemplary embodiment of the present invention will be described with reference to FIG. 6.

First, the broadcasting receiving apparatus receives the broadcasting signal of the broadcasting channel (S10). If the data broadcasting is received, the broadcasting receiving apparatus generates the channel data broadcasting UI 200 including the data broadcasting item corresponding to the broadcasting contents of the tuned broadcasting channel (S20).

At operation S10, the broadcasting receiving apparatus receives the broadcasting signal including the data broadcasting. The broadcasting signal may include the data broadcasting information and the service information.

More particularly, the operation S20 may include operations S21 to S25. The broadcasting receiving apparatus generates the database of the data broadcasting and the database of the service information (S21). For example, the broadcasting receiving apparatus builds the database of the data broadcasting including the data broadcasting item, and stores the received data broadcasting information in the respective tables of the database of the data broadcasting.

Then, the broadcasting receiving apparatus searches the database of the data broadcasting with the keyword of the service information (S22). For example, the broadcasting receiving apparatus detects the service information of the currently-viewed broadcasting channel and detects at least one keyword from the service information. Thus, the broadcasting receiving apparatus may search the data broadcasting information equal to the keyword detected from the database of the data broadcasting generated at operation S21.

The broadcasting receiving apparatus generates the channel data broadcasting UI 200 including the data broadcasting item equal to the keyword, among the plurality of data broadcasting items of the database of the data broadcasting (S23). For example, the broadcasting receiving apparatus generates the channel data broadcasting UI 200 including the data broadcasting item of the data broadcasting information equal to the keyword of the service information searched at operation S22.

Then, the broadcasting receiving apparatus displays the icon to select the channel data broadcasting UI 200 (S24). As shown in FIG. 5, the broadcasting receiving apparatus may display the first icon 310 to select the channel data broadcasting UI 200 and the second icon 320 to select the default data broadcasting UI 20 in the upper right part of the screen 300 displaying the tuned broadcasting channel.

Then, the broadcasting receiving apparatus displays the channel data broadcasting UI 200 if a user selects the icon (S25). For example, if a user selects the first icon 310 through the user input unit 150, the broadcasting receiving apparatus displays the channel data broadcasting UI 200 as shown in FIG. 4. If a user selects the second icon 320 through the user input unit 150, the broadcasting receiving apparatus displays the default data broadcasting UI 20 as shown in FIG. 1.

As described above, the present invention provides a broadcasting receiving apparatus which displays a data broadcasting UI including information on a currently-viewed broadcasting channel, and a control method thereof.

Also, a user may view a data broadcasting and service information together with a broadcasting channel.

Further, a user may select one of a default data broadcasting UI and a data broadcasting UI corresponding to a broadcasting channel and view the selected data broadcasting UI.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method for providing an information User Interface (UI), comprising:
- displaying an image of a content;
- receiving input from a user to provide an information UI for the image that is currently displayed;
- selecting, from among content information, information relating to the currently displayed image;
- generating the information UI that includes the selected information; and
- displaying the generated information UI, wherein the selecting comprises detecting at least one keyword relating to the currently displayed image from service information corresponding to the displayed image which is currently viewed content, searching the content information that matches the detected keyword, and selecting the information relating to the currently displayed image, said selected information matches the detected keyword.

2. The method according to claim 1, further comprising displaying a first icon on the currently displayed image, wherein the receiving comprises receiving the user's input to select the first icon.

3. The method according to claim 2, further comprising:

displaying a second icon on the currently displayed image;

receiving a user's input to select the second icon; and displaying a default information UI that includes the content information.

4. The method according to claim 1, wherein the content comprises a broadcast content, and wherein the image of the content comprises an image of a tuned channel of the broadcast content.

5. The method according to claim 4, wherein the information comprises data broadcast information.

6. The method according to claim 1, wherein the image of the content is displayed with an element and wherein the input of the user comprises a selection of the element and wherein the content information comprises data broadcasting information received in a broadcast signal.

7. The method according to claim 6, further comprising receiving a broadcast signal comprising the image of the content and the content information, which is included in service information of a digital video broadcasting stream and wherein the content information comprises a story line and a preview of next episode.

8. The method according to claim 1, wherein the image of the content is displayed with a first element and a second element, wherein the input of the user comprises a selection of one of the first element and the second element, and wherein the first element relates to the information UI and the second element relates to a default UI that includes said content information organized by categories.

9. The method according to claim 1, wherein the currently viewed content is obtained from a broadcasting signal which comprises the service information for a channel broadcasting the currently broadcast content and broadcasting contents which comprises information about the currently broadcast content.

10. The method according to claim 1, further comprising: receiving the content information which is broadcasting information items and organizing the received broadcasting information items in respective tables and organizing the service information in respective tables and the searching the content information comprises matching the detected keyword in the service information with the respective tables of the broadcasting information items.

11. The method according to claim 1, further comprising generating a channel data broadcasting user interface comprising the selected information that matches the keyword, selected from among a plurality of data broadcasting items.

12. An apparatus for providing an information User Interface (UI), comprising:

a UI generator which generates an information UI; and a controller controls displaying of an image of a content, receives input from a user to provide the information UI for the image that is currently displayed, selects, from among content information, information relating to the currently displayed image, controls the UI generator to generate the information UI that includes the selected information and controls displaying of the generated information UI, wherein the controller detects at least one keyword relating to the currently displayed image from service information corresponding to the displayed image which is currently viewed content , searches the content information that matches the detected keyword, and selects the information relating to the currently displayed image, said selected information matches the detected keyword.

13. The apparatus according to claim 12, wherein the controller controls displaying of a first icon on the currently displayed image and receives the user's input to select the first icon.

14. The apparatus according to claim 13, the controller controls displaying of a second icon on the currently displayed image, receives a user's input to select the second icon and controls displaying of a default information UI that includes the content information.

15. The apparatus according to claim 12, wherein the content comprises a broadcast content, and the image of the content comprises an image of a tuned channel of the broadcast content.

16. The apparatus according to claim 15, wherein the information comprises data broadcast information.

* * * * *